United States Patent [19]

Hawk

[11] 4,149,606
[45] Apr. 17, 1979

[54] WHEEL TRACTOR SUSPENSION SYSTEM

[75] Inventor: Dale W. Hawk, Mesa, Ariz.

[73] Assignee: Fiat-Allis Construction Machinery, Inc., Deerfield, Ill.

[21] Appl. No.: 885,769

[22] Filed: Mar. 13, 1978

[51] Int. Cl.² .................................................. B60G 5/06
[52] U.S. Cl. .................................. 180/14 R; 280/489; 280/492
[58] Field of Search .......................... 180/14 R, 29; 280/405 A, 406 R, 489, 492, 497

[56] References Cited

U.S. PATENT DOCUMENTS 3,450,418 6/1969 Rice .................................. 280/489 X
3,865,135 2/1975 McWilliams et al. .......... 137/596.14

Primary Examiner—Joseph F. Peters, Jr.
Assistant Examiner—Michael Mar
Attorney, Agent, or Firm—August E. Roehrig, Jr.; Robert A. Brown; Harvey W. Rockwell

[57] ABSTRACT

A vehicle suspension system for controlling bouncing and pitching movement of a tractor and trailer unit. The suspension system comprises a four-bar linkage which cushions the vehicle ride by connecting the vehicle axle through the four-bar linkage to permit axle movement which cushions the tractor ride. The four-bar linkage comprises a scraper link, a final drive link, a power module link and a stabilizer link.

13 Claims, 14 Drawing Figures

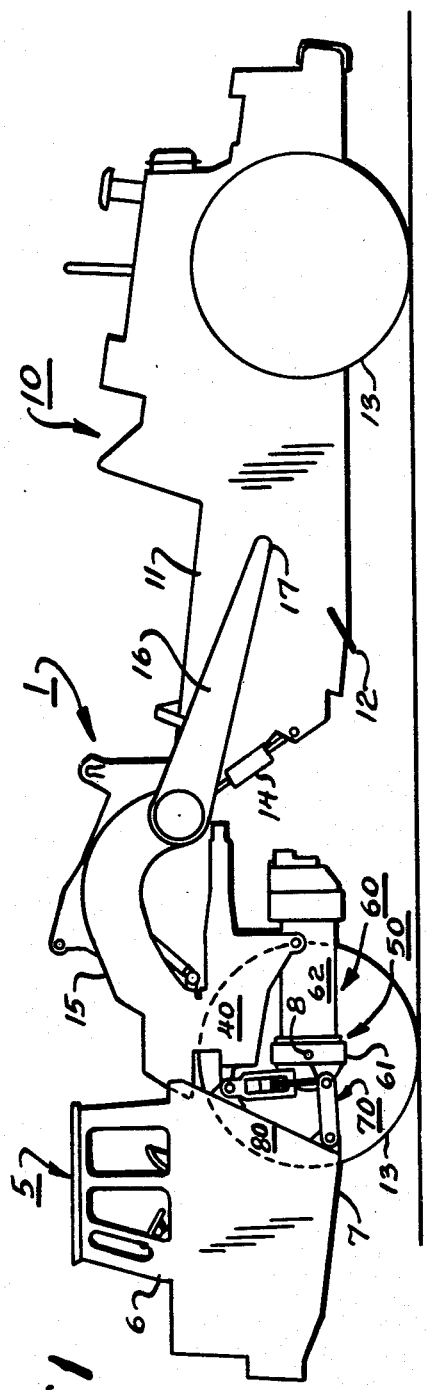
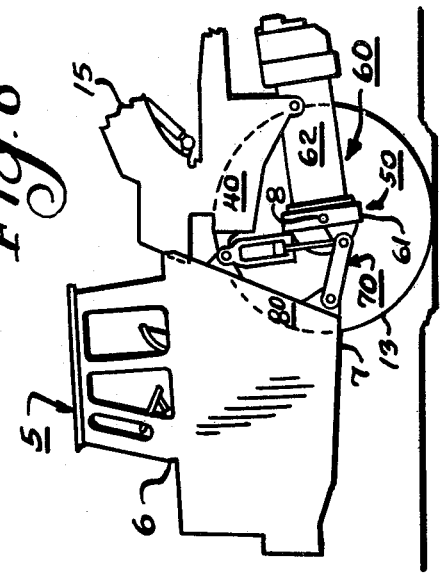
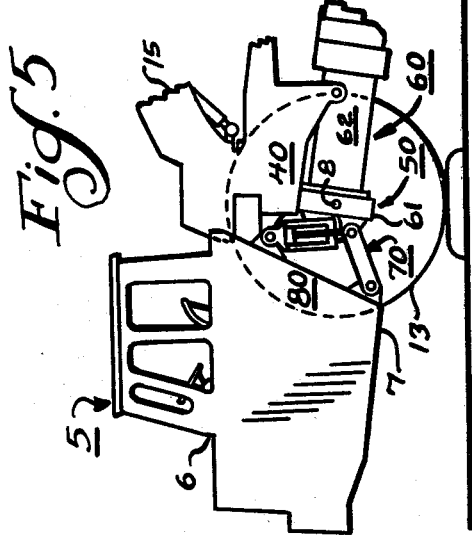
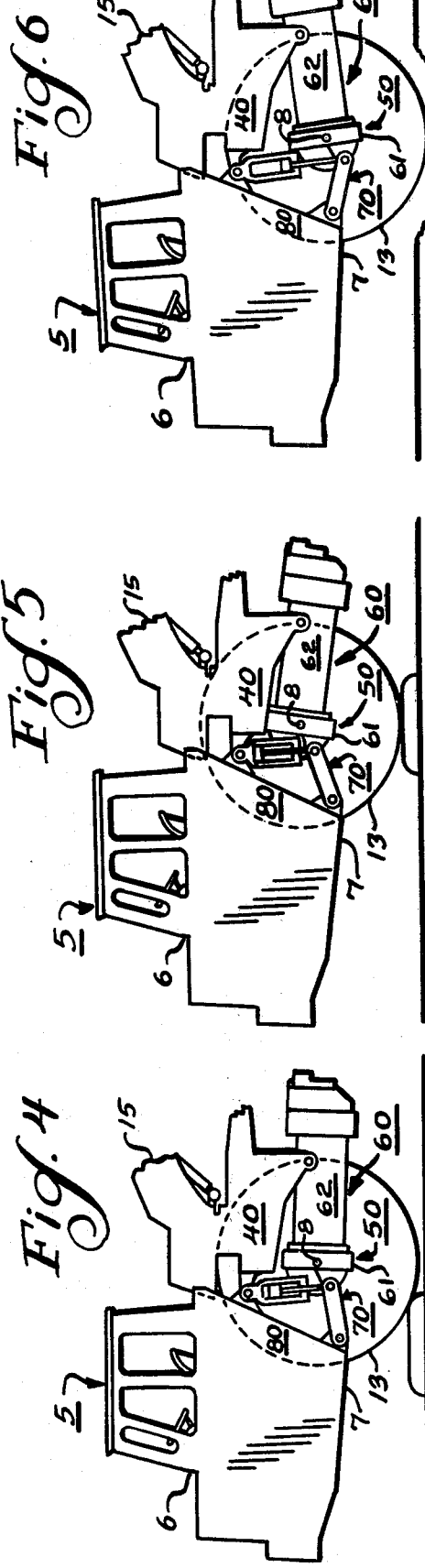

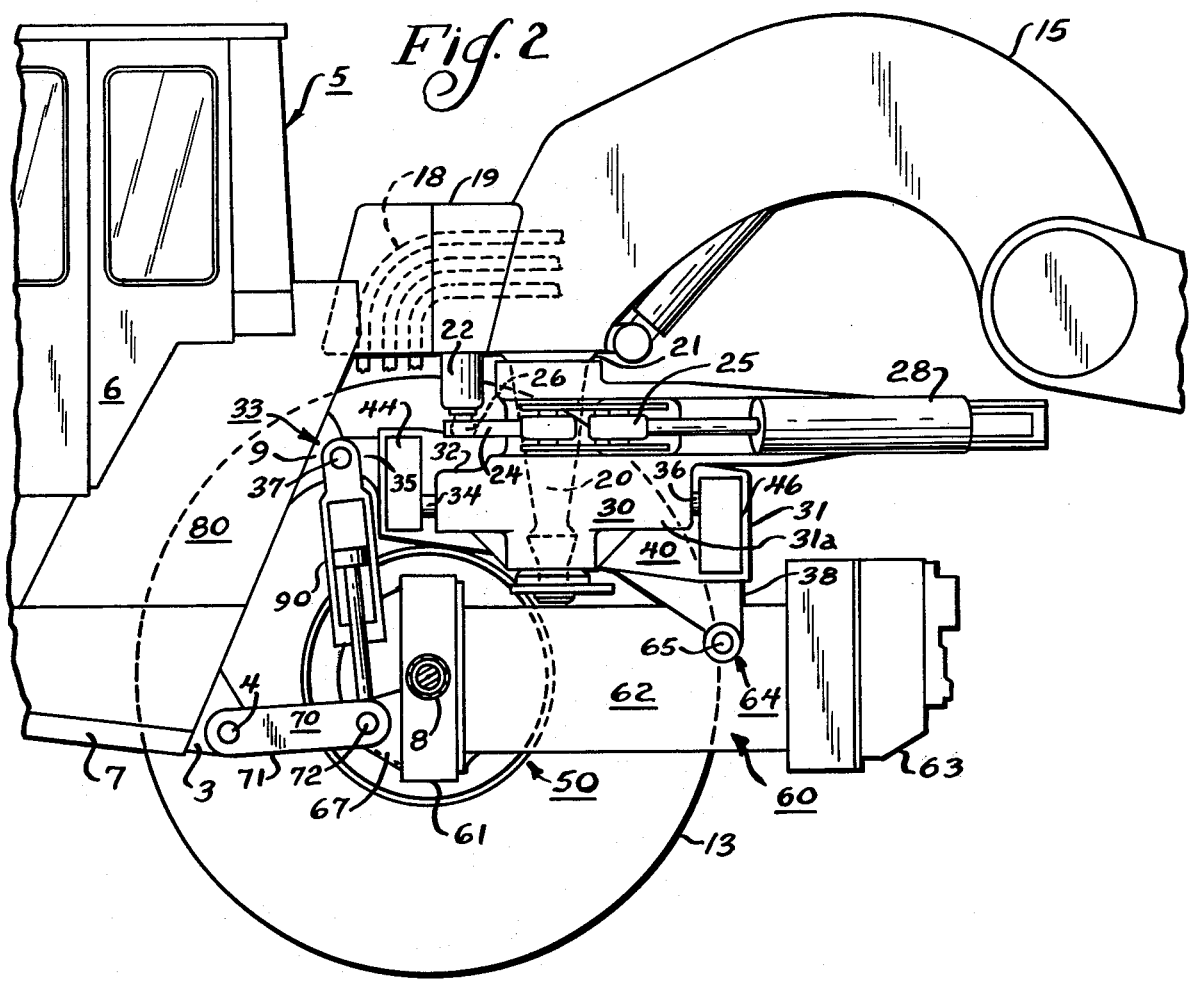
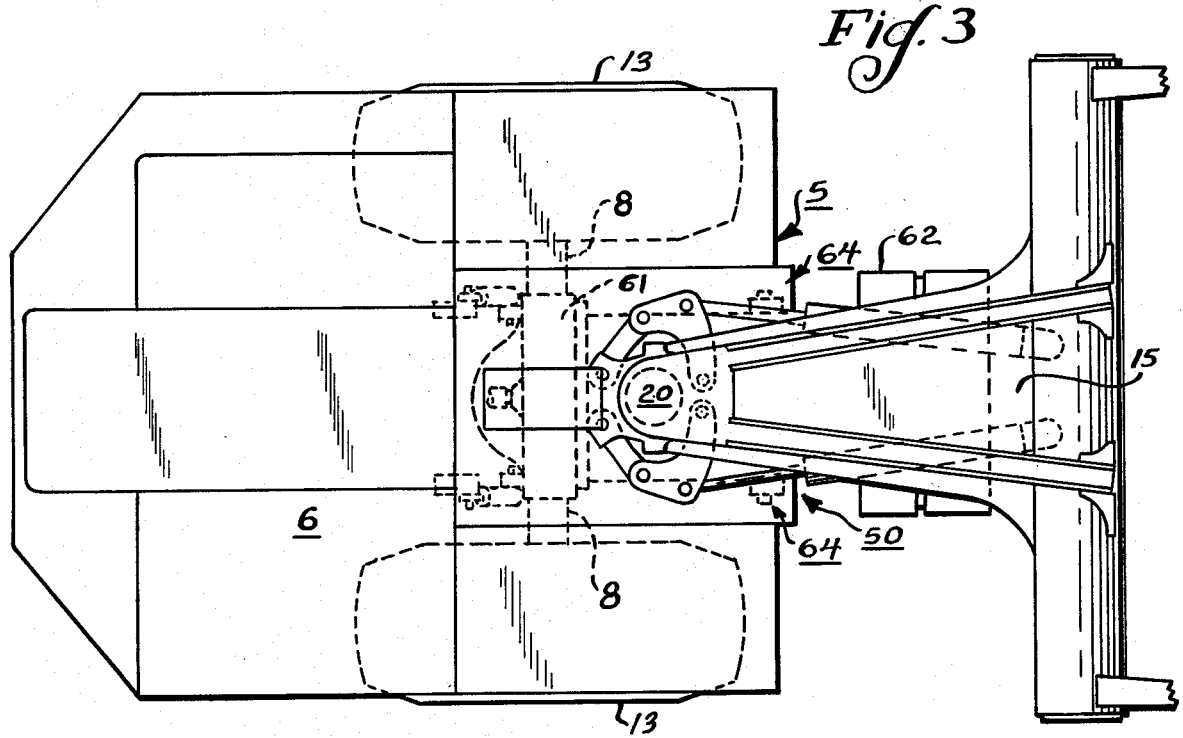

WHEEL TRACTOR SUSPENSION SYSTEM

BACKGROUND OF THE INVENTION

This invention relates in general to vehicle suspension systems and, in particular, to a fluid suspension system especially useful for a two-wheel tractor.

More specifically, but without restriction to the particular use which is shown and described, this invention relates to a fluid suspension system used in a two-wheel tractor and two-wheel earthmoving scraper combination, neither of which is capable of independent level support.

Tractor scrapers are used in many construction applications, such as road building, wherein these four-wheel, two-axle vehicles are used to transport heavy loads of material such as dirt, rock, and gravel over rough terrain from one location to another for levelling or filling the terrain. The scraper comprises a two-wheel tractor and a two-wheel earthmoving trailer which are articulated about a combined draft and steering coupling between the tractor and trailer. The two units are interconnected by a yoke attached to the scraper and pivotally mounted on the tractor by a king pin coupling. The tractor scraper is steered by turning the tractor portion, with respect to the trailer, about the vertically disposed articulation pivot axis through the use of hydraulic jacks connected between the two portions of the vehicle.

In the operation of such two-axle earthmoving tractor scrapers, the resiliency of the tires and the weight of the scraper trailer suspended between the front and rear wheels of the combination creates a vertical bouncing or pitching movement especially during hauls at relatively high vehicle speeds. Due to the large size and weight of the equipment, and of the loads transported by it, ordinary shock absorbers or vibration isolators are impractical to resolve the problems occurring due to such bouncing or pitching movement. Such bouncing or pitching movement is uncomfortable and potentially dangerous for the machine operator and, due to the large shock loads imparted by the bouncing of the trailer unit, can result in damage or failure to structural parts of the vehicle, particularly those closely associated with the load carrying body.

Various attempts have been made to resolve or control bouncing or pitching in tractor-trailer combinations. For example, there is disclosed in U.S. Pat. No. 3,321,216 a method and apparatus for controlling such bouncing through the use of a secondary vibration system tuned to cancel the undesirable vibrations in the primary system.

Another attempt to minimize such bounce is disclosed in U.S. Pat. No. 3,135,529 wherein the tractor portion of the tractor scraper is supported by means of liquidsupport devices. These devices are suspended from the vehicle frame so that the tractor portion is supported by the pressure exerted on the liquid by the weight of the trailer portion of the vehicle. Other such devices are positioned between the tractor axle and the tractor frame to further assist in cushioning the shock and bouncing rhythm.

Another attempt to dampen this bouncing or pitching movement is disclosed in U.S. Pat. No. 3,680,892 which describes an automatic levelling or control device utilizing a mechanical linkage to transmit relative motion between the hitch components to a control valve for a hydraulic cylinder utilized to cushion the vertical movement between the tractor and scraper.

U.S. Pat. No. 3,845,833 discloses another manner of dampening the vertical movement or "lope" of the vehicle by utilizing a pair of ride cylinders, one on each side of the vehicle, which are pivotally mounted between the tractor axle and frame. A similar suspension system is disclosed in U.S. Pat. No. 3,827,518 which utilizes a pair of links permitting the tractor to pitch about a transverse axis as well as permitting relative vertical movement between the tractor and trailer unit. A subframe is pivotally connected to the steering frame and air-oil spring devices are used for cushioning the bounce and pitch.

While many attempts have been made to resolve the problems associated with bouncing and pitching of a tractor scraper, such systems have generally involved complicated hydraulic compensation systems and complex linkage which, in the event of a malfunction, add to the problems these devices were intended to solve. In addition, the complexity of some systems increases unit cost due to the required additional components and decreases the reliability of the scraper equipment which must be shut down in the event of system malfunctions.

SUMMARY OF THE INVENTION

It is, therefore, an object of this invention to improve vehicle suspension systems.

Another object of this invention is to improve the vehicle suspension system of off-highway, earthmoving machines.

A further object of this invention is to dampen the vertical bounce and pitch movement of articulated vehicles.

Still another object of this invention is to improve the riding qualities of two-wheel, tractor-scraper combinations by suppressing the bounce and/or pitch occurring under operating conditions.

These and other objects are attained in accordance with the present invention wherein there is provided a vehicle suspension system for controlling bouncing and pitching movement of a tractor and trailer unit. The suspension system comprises a four-bar linkage which cushions the vehicle ride by connecting the vehicle axle through the four-bar linkage to permit axle movement which cushions the tractor ride. The four-bar linkage comprises a scraper link, a final drive link, a power module link and a stabilizer link.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a vertical profile view of a two-axle tractor scraper utilizing the improved suspension system;

FIG. 2 is an enlarged view of a portion of the vehicle shown in FIG. 1 to better illustrate the components of the suspension system as shown during normal attitude;

FIG. 3 is an enlarged horizontal elevational view of a portion of the vehicle shown in FIG. 1 to better illustrate the components of the suspension system;

FIG. 4 is a vertical profile view of a portion of the vehicle shown in FIG. 1 with the suspension system illustrated in a position in which the vehicle has engaged a bump;

FIG. 5 is a vertical profile view of a portion of the vehicle shown in FIG. 1 to illustrate the suspension system absorbing a bump;

FIG. 6 is a vertical profile view of a portion of the vehicle shown in FIG. 1 illustrating the suspension system in a wheel drop condition.

DESCRIPTION OF THE PREFERRED EMBODIMENTS

Figure 7:
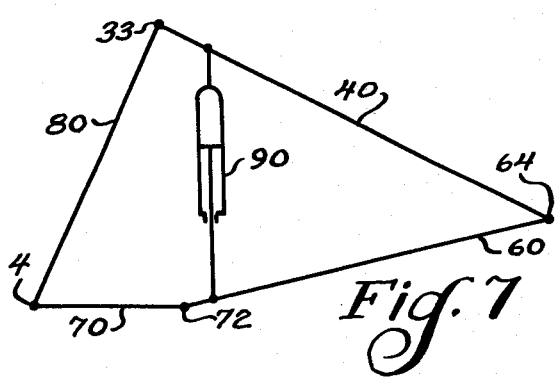
FIGS. 7-14 are mechanical schematics of the four-bar linkage suspension system to illustrate alternative embodiments.

Referring now to FIG. 1 there is shown a construction machine or earthmoving vehicle commonly referred to as a tractor or wheel scraper. Although the vehicle suspension system disclosed herein maybe used with various vehicles, for convenience of illustration the preferred embodiment is illustrated with reference to its use with a four-wheel, two-axle tractor scraper.

Generally, a tractor scraper 1 includes a draft or tractor unit 5 and a drawn or trailer unit 10. The trailer unit 10 includes a scraper bowl 11 supported at its rear end by a pair of wheels 13 and at its front end by a draft frame 15 having a pair of rearwardly extending legs 16 pivotally connected to the vertical sidewalls of the scraper bowl 11 by a transverse pivot axis 17.

The scraper bowl 11 includes a cutting edge 12 at the front end of the bottom which excavates a predetermined amount of earth as the tractor scraper passes through a cut or borrow site. The amount of material removed as the scraper passes is controlled by raising or lowering the cutting edge 12 carried by the front end of the scraper bowl. This positioning of the cutting edge 12 of the scraper bowl is effected by a pair of hydraulic jacks 14 interconnecting the draft frame 15 at the front or leading portion of the scraper bowl. The jacks 14 are expanded or contracted to determine the depth of the cut of the cutting edge 12 with material being excavated passing into the scraper bowl as the scraper is moved forwardly.

The draft unit 5 of the scraper 1 is supported by a pair of wheels 13 and includes an operator cab 6 having an instrument and control panel conveniently located within reach of the operator for controlling the vehicle as well as to monitor or adjust various accessory or auxiliary equipment of the vehicle for effecting desired operation. A plurality of fluid conduits or hoses, indicated at 18, arise from the vehicle frame 7 beneath a guard plate or housing 19 and are turned across the gooseneck 15 to supply fluid to actuators on the trailer for permitting an operator in the cab 6 on the tractor 5 to control functions of the trailer 10.

The trailer unit 10 is joined to the draft unit 5 by means of the draft frame or split gooseneck 15. A king pin member 20 is secured to a forward portion of the gooseneck 15 and is adapted to be rotatably received in a cooperating bearing socket in a hitch assembly 30 which has a horizontal pivot connection to a hitch support frame 31. With this type connection the traction wheels 13 of the tractor unit 5 support a portion of the trailer unit 10 and its load. The two-wheel tractor 5 is in a stable condition only when the trailer unit 10 is connected to it through the gooseneck 15 and the hitch assembly 30 which is best shown in FIGS. 2 and 3.

The hitch assembly 30 comprises a hitch casing 31a having a portion 32 which forms a horizontal pivot member and a portion which forms a bearing socket for the vertically disposed king pin member 20. The horizontal pivot forming portion 32 is provided with axially aligned pivot pins or members 34 and 36 which are received in axially aligned bearing forming members 44 and 46 spaced longitudinally of the tractor portion 5. The pivot pins 34 and 36 and the cooperating bearing forming members 44 and 46 may be constructed and assembled in the manner shown or as described in U.S. Pat. No. 3,348,888 granted Oct. 24, 1967, so as to enable the hitch assembly 30 to pivot about an axis extending longitudinally of the tractor portion 5.

The vertical king pin 20 depends from an end plate portion 21 on the gooseneck which has a downturned edge or marginal portion 22 on the forward margin. On the bottom face of the forward flange portion 22 one end of right and left hand linkages 24 (FIG. 2) are secured by ball and socket connections 26. The linkages 24 are each pivotally connected at 25 to the forward ends of the operating pistons of right and left hand hydraulic steering cylinders 28 so as to enable the operator to control the direction of movement of the tractor unit 5 relative to the trailer unit 10 to steer the vehicle.

Referring now to the vehicle suspension system 50, each of the drive wheels 13 of the tractor portion 5 are rotatably journaled upon suitable axle extensions 8 carried by an axle assembly 61, which is secured to an axle support frame. The axle support frame 62 also supports a transmission 63 which is connected through appropriate drive connections (not shown) to an engine carried by the tractor portion 5. In this manner the tractor engine delivers torque through the drive line to the transmission which is further coupled through a suitable differential to provide rotary power to each of the drive wheels 13. Since supporting axles of the drive wheels 13 are carried by the axle assembly 61 secured to the axle support frame 62, the axle frame 62 will pivot in response to the movements of the drive wheels 13 in a manner hereinafter described in detail.

In order to cushion the ride of the tractor portion, the wheels 13 are connected in a four-bar linkage to allow the wheel axle extensions 8, which are carried by and form a part of the axle assembly 61, to move relative to the gooseneck connection 15 and the tractor portion 5 of the tractor scraper. While FIG. 2 illustrates one side of the vehicle suspension system 50, it is to be understood that the linkage system to be hereinafter described in detail is coupled to the various components of the wheel scraper in the same manner for both drive wheels 13. For convenience of illustration the four-bar linkage system will be described with reference to the following components which form the major portion of each respective link:

A scraper link 40 comprising the hitch support frame 31 and the hitch assembly 30 connected to the trailer portion 10;

A final drive link 60 comprising the axle support frame 62, the axle assembly 61, the drive wheels 13 and connecting wheel axle extensions 8;

A stabilizer link 70 comprising a stabilizer bar 71 pivotally connected to the vehicle tractor portion 5; and A power module link 80 comprising the tractor frame 7.

As best shown in FIG. 2 in which one of the drive wheels 13 of the tractor portion 5 has been removed to better illustrate the suspension system 50, as previously stated the axle extensions 8 of the drive wheels 13 are a part of the axle assembly 61 secured to the axle support frame 62. The rear portion of the axle frame 62 is supported from and pivotally connected to the hitch frame 31 which is connected through the hitch assembly 30 to the scraper or trailer portion 10 of the tractor scraper. A pivot connection 64 pivotally connects both sides of the axle frame 62 relative to the hitch frame 31 by means of pivot pins 65 carried on each side of the axle frame 62 to engage a journaled bearing surface of a pair of hitch flange or ear portions 38 formed on the rearward portion of the hitch frame 31. The axle assembly 61 secured to the axle frame 62 has a pair of axle ears or flanges 67 extending forwardly therefrom to pivotally connect the forward portion of the axle assembly to a pair of stabilizer bars 71 by means of pivot pins 72 joining the stabilizer bars 71 to the axle flange portions 67 to permit relative pivotal movement therebetween. In this manner the final drive link 60 is pivotally connected to a portion of the scraper link 40 and to the stabilizer link 70.

The opposite ends of the stabilizer bars 71 are pivotally connected to a flange or ear portion 3 of the vehicle frame 7 through a pivot pin 4. In this manner the stabilizer link 70 is also pivotally connected to the power module link 80.

The power module link 80 is also pivotally connected to the scraper link 40 at a pivot connection 33. A pair of rearwardly extending ears 9 are secured to the tractor frame 7 of the tractor portion 5 and are coupled to the forward end of hitch frame 31 opposite to the pivot connection 64 with the axle frame 62. The forward end of the hitch frame 31 has a pair of forwardly extending ears or flanges 35 which are pivotally connected to the pair of rearwardly extending flanges 9 secured to the tractor frame 7 by means of pivot pins 37. Therefore, the power module link 80 is also pivotally connected to the scraper link 40.

With the components of the vehicle comprising the scraper link 40, final drive link 60, stabilizer link 70 and power module link 80 pivotally connected in the manner previously described, a four-bar linkage is formed. In this manner as the drive wheels 13 of the tractor portion 5 move upwardly and downwardly, the axle assembly 61 secured to the axle frame 62 will move in unison therewith. The pivotal movement of the axle frame 62 will effect pivotal movement of the stabilizer bar 71 and pivotal movement of the vehicle frame 7.

In order to complete the suspension system and to modulate or dampen the pivotal movement of this four-bar linkage, a hydraulic cylinder and gas charged accumulator suspension and damping system is operatively connected between the pivot pin 37 which joins the hitch frame 35 of the hitch frame 31 to a portion of the tractor frame 7, and the pivot pin 72 which joins the axle flange 67 with the stabilizer bar 71. In this manner as the components or linkage elements of the four-bar linkage pivot relative to each other, such movement is controlled and dampened by means of a hydraulic cylinder 90 of the suspension and damping system which is connected between the two pivot pins 37 and 72. In order to properly function the hydraulic cylinder 90 can be of the type provided with suitable accumulators, valves and other hydraulic components such as those disclosed in U.S. Pat. No. 3,118,686.

While the mechanism disclosed in FIGS. 1 and 2 shows the suspension system during normal level vehicle operation, FIGS. 4, 5 and 6 show the various positioning of the linkages during different operational conditions.

In FIG. 4 the suspension system is illustrated in a position wherein the drive wheels 13 of the tractor portion 5 have engaged a large object or bump and are beginning to rise above the wheels supporting the trailer portion. In this position the axle assembly 61 which supports the tractor drive wheels 13 begins to pivot about the pivot connection 64 which is pivotally connected to the hitch frame 31 and the stabilizer bar 71 begins to rotate in a counter-clockwise direction raising the rod and piston of the hydraulic cylinder 90. In FIG. 5, the upper limit of this pivotal movement is illustrated.

In FIG. 6 the drive wheels 13 of the tractor portion 5 have dropped such as when engaging a hole and are, therefore, lower than the wheels supporting the trailer portion. In this manner the axle assembly 61, secured to the axle frame 62 which supports the drive wheels 13 of the tractor unit 5, drops downwardly relative to the rear portion of the axle frame which is pivotally connected to the hitch frame 30. Such pivotal movement causes the stabilizer bar 71 to rotate clockwise extending the cylinder rod and piston of the hydraulic cylinder 90 to cushion or dampen the vehicle bounce.

Figure 8:
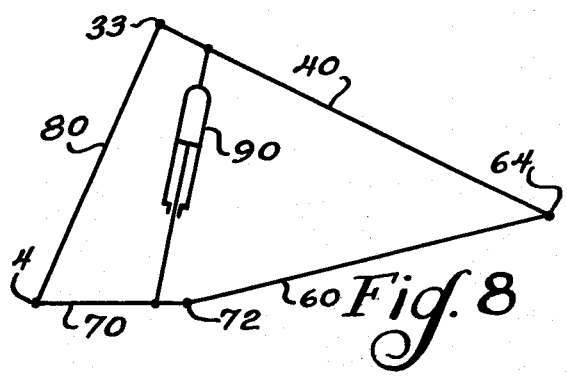
Figure 12:
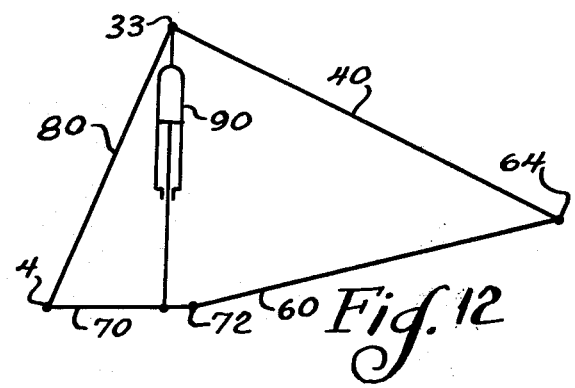
Figure 13:
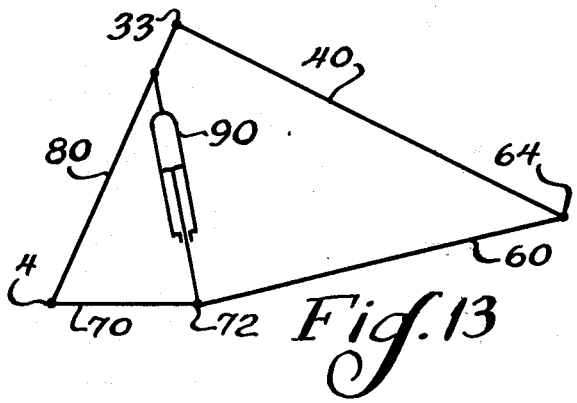
Figure 14:
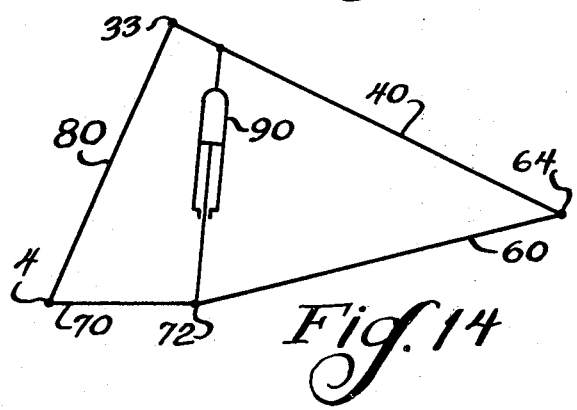

Referring now to the embodiments of FIGS. 7–14, there are schematically illustrated the components of the four-bar linkage suspension system with the hydraulic dampening cylinder 90 coupled between various components and their pivotal connections. FIG. 7 shows the hydraulic dampening cylinder 90 secured between the scraper link 40 and the final drive link 60 such that relative pivotal movement between these components will be dampened. In FIGS. 8 and 14, one end of the hydraulic dampening cylinder 90 is also secured to the scraper link 40 while the opposite end is secured to the stabilizer link 70 or the pivot connection 72 of the stabilizer link 70 and the final drive link 60, respectively.

Figure 9:
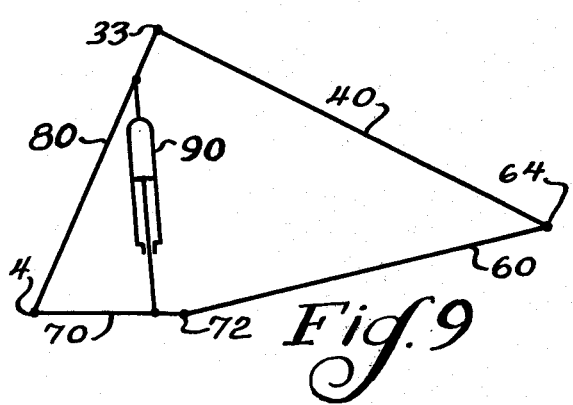
Figure 10:
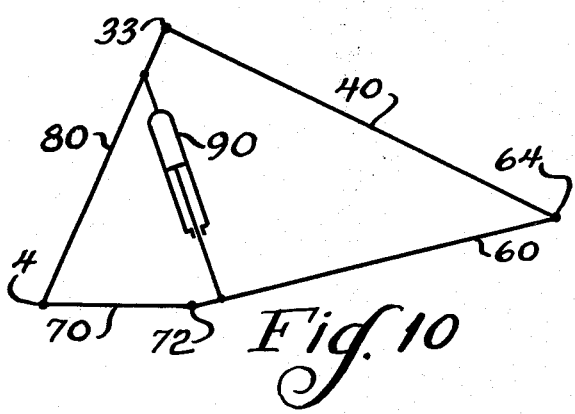

FIGS. 9, 10, and 13 illustrate the hydraulic dampening cylinder 90 with one end coupled to the power module link 80. The opposite end of the cylinder 90 is shown coupled to the stabilizer link 70, the final drive link 60 and the pivotal connection 72, respectively. In this manner, relative pivotal movement between the links will be dampened by the action of the hydraulic dampening cylinder 90.

Figure 11:
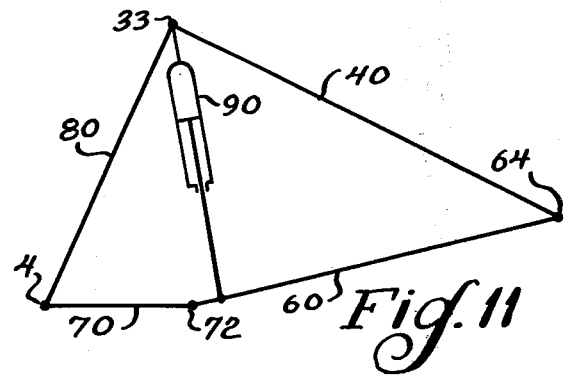

In FIGS. 11 and 12, one end of the hydraulic dampening cylinder 90 is connected to the pivotal connection 33 as discussed with reference to the embodiment disclosed in FIGS. 1–6. However, the opposite end of the cylinder 90 is coupled to the final drive link 60 and the stabilizer link 70, respectively, such that pivotal movement therebetween will be dampened.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

What is claimed is:

1. A vehicle suspension system for use with a vehicle having a tractor portion carried on a tractor frame and a trailer portion coupled thereto comprising axle support means operatively connected to a pair of axle supported vehicle drive wheels and supporting said vehicle drive wheels for vertical movement relative to an operational surface over which the vehicle is driven, hitch means coupled to the trailer portion for joining the trailer portion to the frame of the tractor portion of the vehicle, said hitch means supporting said axle support means for pivotal movement relative thereto, said hitch means connected to the frame of the tractor portion for pivotal movement in a plane normal to the operational surface of the vehicle, stabilizing means pivotally connected between the frame of the tractor portion of the vehicle and said axle support means to stabilize pivotal movement of the drive wheel supporting axle support means relative to the hitch means, and vertical wheel movement dampening means having one portion coupled between the pivotal connection of said hitch means and said tractor frame, or to either one of said hitch means or said tractor frame, and having another portion coupled to the pivotal connection between said stabilizing means and said axle support means, or to either one of said stabilizing means or said axle support means for dampening the vertical movement of the vehicle drive wheels relative to the operational surface over which the vehicle is moved.

2. The apparatus of claim 1 wherein the vehicle drive wheels are supported from said axle means between the connection with said hitch means and the connection to said stabilizing means.

3. The apparatus of claim 1 wherein said vertical wheel movement dampening means includes a hydraulic cylinder.

4. The apparatus of claim 1 wherein said hitch means is coupled on opposite parallel sides of the axle support means and on opposite parallel sides of the frame of the tractor portion of the vehicle, and said stabilizing means is connected on opposite parallel sides of said vehicle transmission and on opposite parallel sides of the frame of the tractor portion of the vehicle.

5. The apparatus of claim 1 wherein said vertical wheel movement dampening means is coupled between the pivotal connection of said hitch means to the frame of the tractor portion and the pivotal connection of the stabilizing means to said axle support means.

6. The apparatus of claim 1 wherein said vertical wheel movement dampening means is coupled between said hitch means and said axle means.

7. The apparatus of claim 1 wherein said vertical wheel movement dampening means is coupled between said hitch means and said stabilizing means.

8. The apparatus of claim 1 wherein said vertical wheel movement dampening means is coupled between said tractor frame and said stabilizing means.

9. The apparatus of claim 1 wherein said vertical wheel movement dampening means is coupled between said tractor frame and said axle support means.

10. The apparatus of claim 1 wherein said vertical wheel movement dampening means is coupled between the pivotal connection of said hitch means to the frame of the tractor portion and said axle support means.

11. The apparatus of claim 1 wherein said vertical wheel movement dampening means is coupled between the pivotal connection of said hitch means to the frame of the tractor portion and said stabilizing means.

12. The apparatus of claim 1 wherein said vertical wheel movement dampening means is coupled between said tractor frame and said pivotal connection of said stabilizing means to said axle support means.

13. The apparatus of claim 1 wherein said vertical wheel movement dampening means is coupled between said hitch means and the pivotal connection of said stabilizing means to said axle support means.

* * * * *